US012192702B2

(12) United States Patent
Dan et al.

(10) Patent No.: US 12,192,702 B2
(45) Date of Patent: Jan. 7, 2025

(54) MEMS SPEAKER

(71) Applicants: AAC Kaitai Technologies (Wuhan) CO., LTD, Hubei (CN); AAC ACOUSTIC TECHNOLOGIES (SHENZHEN) CO., LTD., Shenzhen (CN)

(72) Inventors: Qiang Dan, Shenzhen (CN); Yu Shen, Shenzhen (CN); Yiwei Zhou, Shenzhen (CN); Yang Li, Shenzhen (CN)

(73) Assignees: AAC Kaitai Technologies (Wuhan) CO., LTD, Wuhan (CN); AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 170 days.

(21) Appl. No.: 17/969,668

(22) Filed: Oct. 19, 2022

(65) Prior Publication Data

US 2023/0412988 A1 Dec. 21, 2023

(30) Foreign Application Priority Data

Jun. 20, 2022 (CN) ......................... 202221548281.0

(51) Int. Cl.
*H04R 17/00* (2006.01)

(52) U.S. Cl.
CPC ....... *H04R 17/00* (2013.01); *H04R 2201/003* (2013.01)

(58) Field of Classification Search
CPC .... H04R 17/00; H04R 2201/003; H04R 7/10; H04R 25/606; H04R 17/02; B41J 2/14427; B41J 2/03; A61N 1/36038; H02N 1/002
See application file for complete search history.

(56) References Cited

U.S. PATENT DOCUMENTS

| | | | | |
|---|---|---|---|---|
| 8,529,021 | B2 * | 9/2013 | Baumer | B41J 2/03<br>347/65 |
| 9,630,007 | B2 * | 4/2017 | Kulah | A61N 1/36038 |
| 2012/0053393 | A1 * | 3/2012 | Kaltenbacher | H04R 25/606<br>29/25.35 |
| 2012/0268513 | A1 * | 10/2012 | Huffman | B41J 2/14427<br>347/54 |
| 2012/0270352 | A1 * | 10/2012 | Huffman | H02N 1/002<br>257/E21.002 |
| 2021/0067880 | A1 * | 3/2021 | Cheng | H04R 17/02 |

* cited by examiner

*Primary Examiner* — Angelica M McKinney
(74) *Attorney, Agent, or Firm* — W&G Law Group

(57) ABSTRACT

The invention provides a MEMS speaker including a substrate enclosing a cavity, a cantilever beam at least partially suspended above the cavity, a piezoelectric actuator away from the cavity, a polymer layer away from the cavity and attached to the cantilever beam and the piezoelectric actuator for completely covering the cantilever beam, the piezoelectric actuator and the cavity, and a piezoelectric composite vibration structure formed by the polymer layer. The cantilever beam includes a first section fixed to the substrate, a second section extending from the first section to the cavity and suspended above the cavity, and a third section extending from the second section away from the first section, an end of the third section away from the second section being suspended; and the piezoelectric actuator is only fixed with the third section.

9 Claims, 12 Drawing Sheets

A-A

C-C

MEMS SPEAKER

FIELD OF THE PRESENT DISCLOSURE

The present invention relates to the field of electro-acoustic conversion, in particular to a MEMS speaker used in portable mobile electronic products.

DESCRIPTION OF RELATED ART

The MEMS speaker are widely used in portable mobile electronic products, such as mobile phones, to convert audio signals into sound playback. The miniaturization of portable mobile electronics drives the miniaturization of MEMS speaker more and more widely. The sound pressure level (SPL) of MEMS speaker is an important indicator in acoustic performance.

The speaker in the related art includes a substrate enclosing a cavity and being set with openings at both ends, a cantilever beam bending and extending from one end of the substrate to the cavity, and a piezoelectric actuator fixed on the side of the cantilever beam away from the cavity and an elastic connection element. The cantilever beam and the substrate opposite to its extension direction are arranged at intervals, and the cantilever beam is connected to the substrate opposite to its extension direction through the elastic connection element. The elastic connection element, the cantilever beam and the piezoelectric actuator together form a piezoelectric composite vibration membrane structure for vibration and sound generation. Wherein, the piezoelectric actuator covers the entire cantilever beam (at least one end of the cantilever beam fixed to the substrate).

However, for the MEMS speaker of the related art, it is difficult to obtain a high sound pressure level (SPL) because the miniaturization makes the sounding area of the piezoelectric composite vibration membrane structure small, and the resonant frequency (F0) of the miniaturized MEMS speaker is relatively high. In the resonance state of the high resonance frequency (F0) of the miniaturized MEMS speaker, the vibration amplitude of the piezoelectric composite vibration membrane structure is small. Therefore, under the condition that the size of the peripheral design remains unchanged, a technical problem that needs to be solved is: how to increase the sounding area of the piezoelectric vibration composite membrane structure in the middle and high frequency bands, so that the vibration amplitude of the piezoelectric composite vibration membrane structure becomes larger, thereby increasing the sound pressure level (SPL) of the MEMS speaker.

Therefore, it is necessary to provide a new MEMS speaker to solve the above technical problems.

SUMMARY OF THE PRESENT INVENTION

The present invention is to provide a MEMS speaker with a high sound pressure level in the middle and high frequency bands.

Accordingly, the present invention provides a MEMS speaker including: a substrate enclosing a cavity and being provided with openings at both ends; a cantilever beam extending from one end of the substrate to the cavity and at least partially suspended above the cavity; a piezoelectric actuator fixed on a side of the cantilever beam away from the cavity; a polymer layer disposed on a side of the piezoelectric actuator away from the cavity and attached to the cantilever beam and the piezoelectric actuator for completely covering the cantilever beam, the piezoelectric actuator and the cavity; and a piezoelectric composite vibration structure formed by the polymer layer, the cantilever beam and the piezoelectric actuator for generating vibration and sound.

The cantilever beam includes a first section fixed to the substrate, a second section extending from the first section to the cavity and suspended above the cavity, and a third section extending from the second section away from the first section, an end of the third section away from the second section being suspended. The piezoelectric actuator is only fixed with the third section.

In addition, the MEMS speaker includes a dielectric layer sandwiched between the first section and the substrate; wherein a material of the dielectric layer is different from that of the substrate.

In addition, the piezoelectric actuator includes a first electrode, a piezoelectric layer and a second electrode stacked in a sequence on the third section along a thickness direction of the MEMS speaker; a projection of the piezoelectric actuator along the thickness direction of the MEMS speaker covers only the third section.

In addition, a sectional area of the second section connected to the connection position of the third section is smaller than a sectional area of the third section at a connection position; in the extension direction of the cantilever beam, the sectional areas at different positions of the second section are equal, and the sectional areas of the third section gradually decrease.

In addition, the MEMS speaker includes multiple spaced cantilever beams and multiple piezoelectric actuators; wherein a first structural gap is formed between two adjacent cantilever beams; each of the piezoelectric actuators is fixed on one of the cantilever beams; ends of the third sections of each of the plurality of cantilever beams that are close to each other are spaced apart from each other and together form a second structural gap communicated with the first structural gap and forms a structural gap together; the second structural gap is located in a central region of the cavity; and the structural gap is communicated with the cavity.

In addition, a first structural gap is formed between the third sections of two adjacent cantilever beams.

In addition, the MEMS speaker includes a weight accommodated in the second structural gap and connected to the polymer layer or the cantilever beam; wherein the weight, the polymer layer, the cantilever beam and the piezoelectric actuator together form the piezoelectric composite vibration structure.

In addition, the MEMS speaker includes an elastic connection element accommodated in the second structural gap; wherein one end of the third section of each cantilever beam away from the first section is connected to the weight through the elastic connection element.

In addition, a side of the weight away from the cavity is fixed to the polymer layer; and the weight is spaced from the third section.

In addition, the weight is adjustable in height and extends at least partially into the cavity.

Compared with related technologies, the MEMS speaker provided by the present invention set the cantilever beam as the first section, the second section and the third section extending in sequence, and the piezoelectric actuator is only fixed in the third section. A second section is formed between the third section and the first section fixed to the substrate, and the second section is suspended above the cavity. The end of the third section away from the second section is suspended. When powered on, the piezoelectric actuator drives the third section to vibrate to drive the second section to vibrate. The polymer layer, the cantilever beam and the piezoelectric actuator together form a piezoelectric composite vibration structure for vibrating sound, thus, the sounding area of the MEMS speaker is large. Excellent mid-to-high frequency response improves the sound pressure level (SPL) of the MEMS speaker.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Embodiment 1

Figure 1:
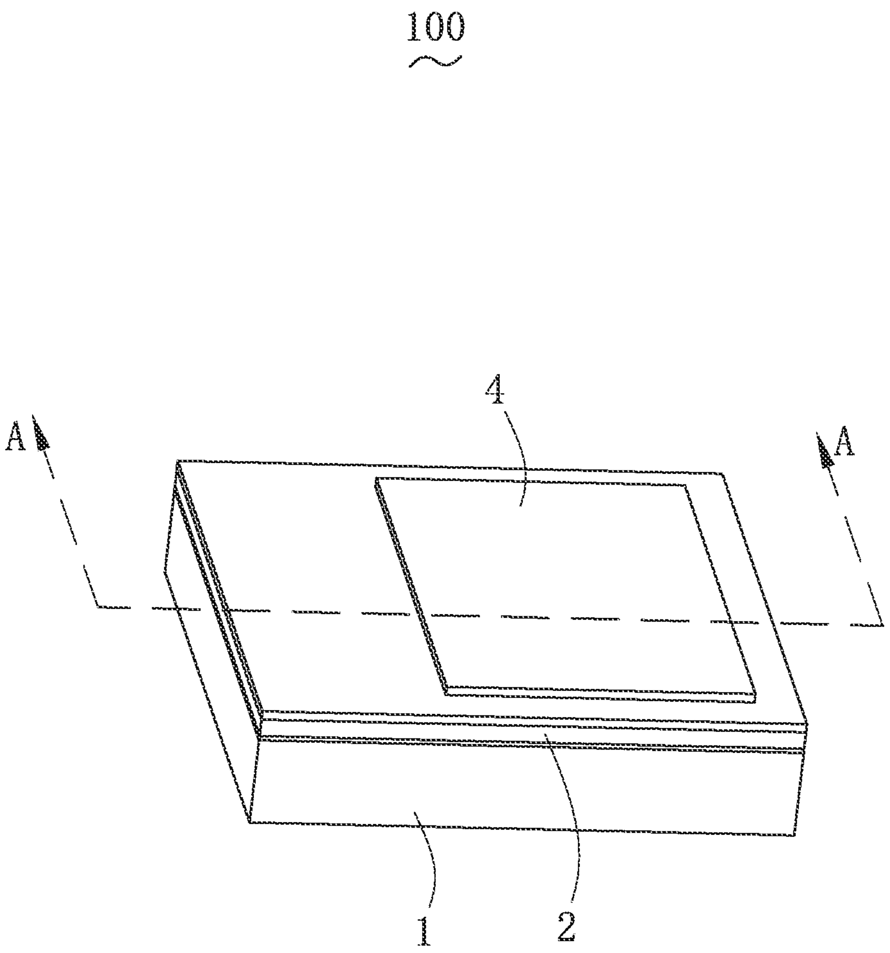
FIG. 1 is an isometric view of a MEMS speaker in accordance with a first embodiment of the present invention.
Figure 2:
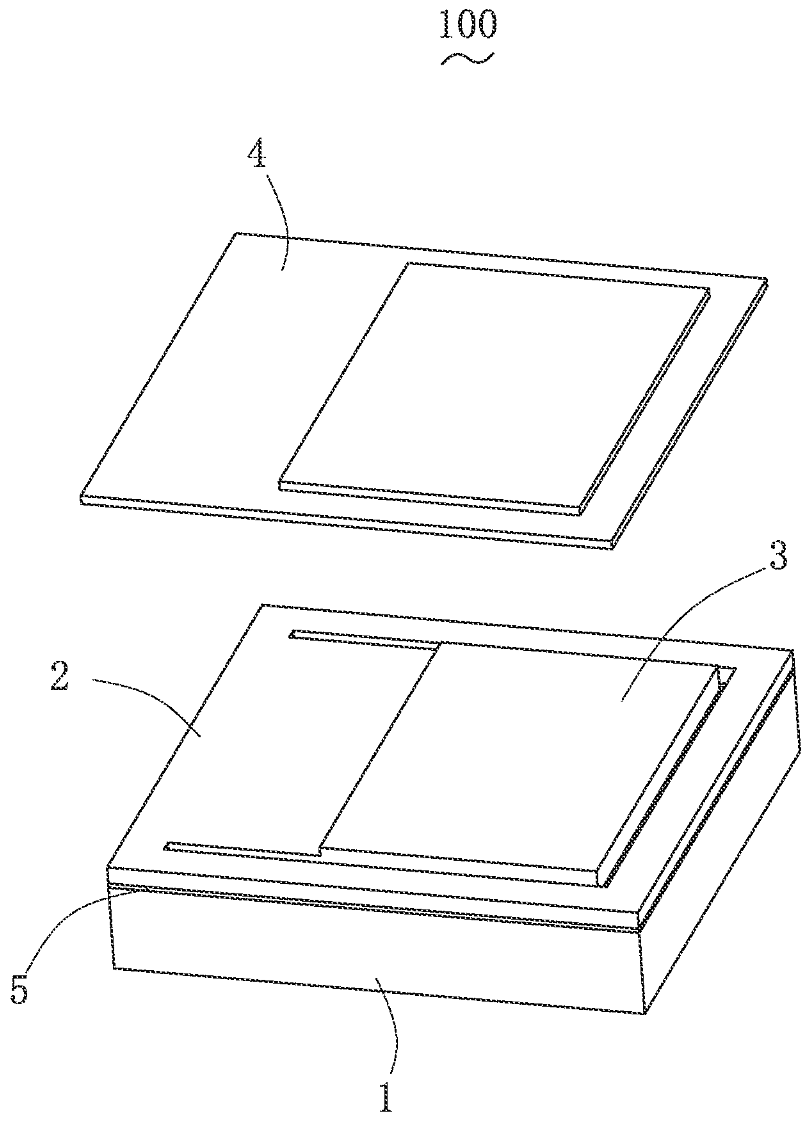
FIG. 2 is an exploded view of the MEMS speaker in FIG. 1.

The present invention provides a MEMS speaker 100. Please also refer to FIGS. 1-3.

MEMS speaker 100 include substrate 1, cantilever beam 2, piezoelectric actuator 3, and polymer layer 4.

The substrate 1 is surrounded by a cavity 10 and both ends are set with openings. In the first embodiment, the substrate 1 is rectangular. The substrate 1 is a silicon substrate. However, the substrate 1 of the present disclosure is not limited to the example of the embodiment, and may also be a SOI substrate sheet or other substrate sheet.

The cantilever beam 2 extends from one end of the substrate 1 to the cavity 10 and is at least partially suspended above the cavity 10. Specifically, the cantilever beam 2 includes a first section 21 fixed to the substrate 1, a second section 22 extending from the first section 21 to the cavity 10 and suspended above the cavity 10, and a third section 23 extending away from the first section 21 from the second section 22.

In the first embodiment, the quantity of the cantilever beam 2 is one. One end of the cantilever beam 2 away from the substrate 1 is suspended above the cavity 10. Specifically, one end of the third section 23 away from the second section 22 is suspended above the cavity 10.

The piezoelectric actuator 3 includes a first electrode, a piezoelectric layer and a second electrode that are stacked in sequence on the third section 23 along the thickness direction of the MEMS speaker. The projection of the piezoelectric actuator 3 along the thickness direction of the MEMS speaker 100 only covers the third section 23. The piezoelectric actuator 3 is only fixed on the side of the cantilever beam 2 away from the cavity 10. Specifically, the piezoelectric actuator 3 is only fixed on the third section 23. Since the piezoelectric actuator 3 is arranged on the third section 23, the position is far from the first section 21 fixed on the substrate 1, and the second section 22 is spaced therebetween, and the third section 23 is suspended. Therefore, this structure drives the third section 23 to vibrate when the piezoelectric actuator 3 is powered on, thereby driving the second section 22 to vibrate, and the vibration amplitude of the third section 23 is relatively large. Compared with the MEMS speaker in related art, the piezoelectric actuator is fixed to the first section 21, the second section 22 and the third section 23 at the same time, compared with the piezoelectric actuator of the related art, when the piezoelectric actuator is powered on and vibrates, its vibration amplitude is smaller. The vibration amplitude of diaphragm formed by the piezoelectric actuator 3 and the cantilever beam 2 is large, thereby increasing the sound pressure level (SPL) of the MEMS speaker 100 in the middle and high frequency bands.

Figure 3:
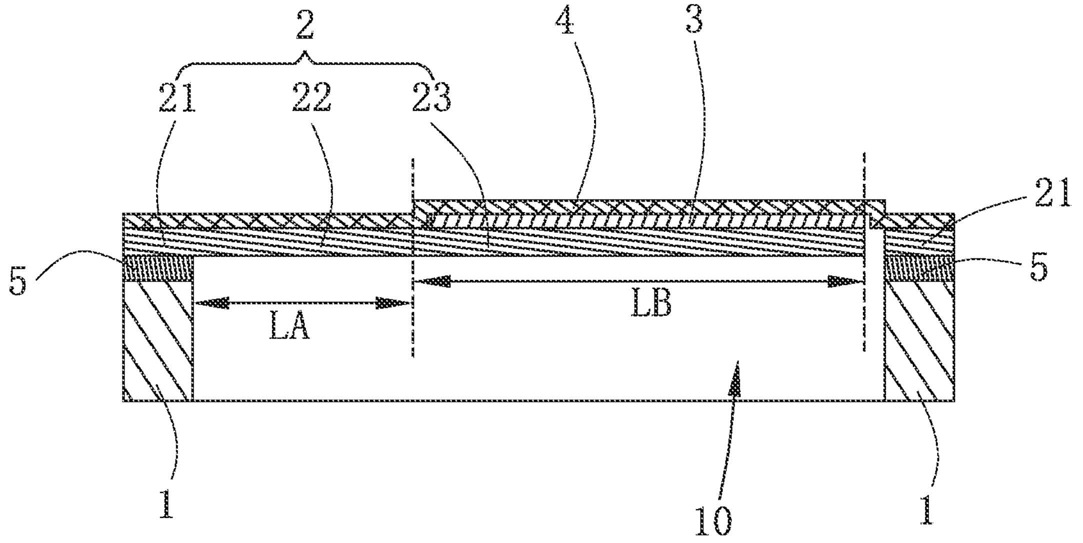
FIG. 3 is a cross-sectional view of the MEMS speaker taken along line AA in FIG. 1.

Please refer to FIG. 3, the length of the second section 22 is la, and the length of the third section 23 is lb. This is illustrated by the ratio, wherein, ratio=lb/(la+lb).

Figure 4:
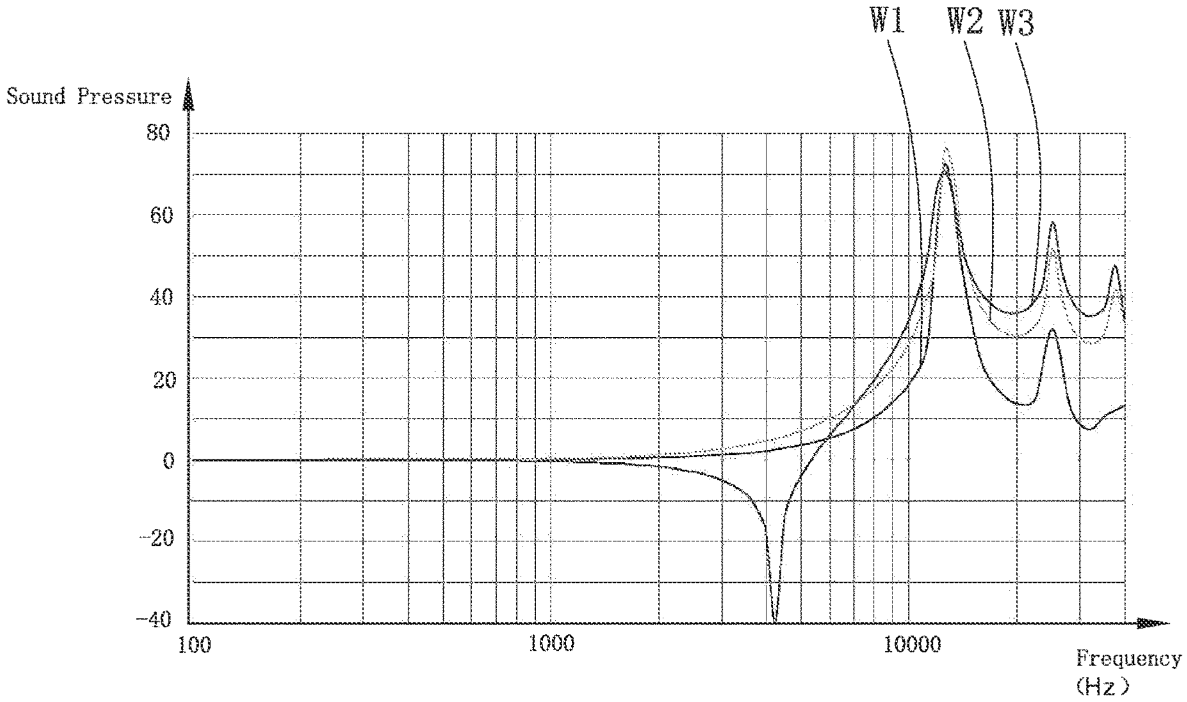
FIG. 4 shows a relationship between sound pressure level and frequency of the MEMS speaker of the first embodiment of the present invention.

Please refer to FIG. 4, FIG. 4 shows the relationship between sound pressure level and frequency of MEMS speaker 100 of the first embodiment of the present invention.

The curve of the related art MEMS speaker is w1.

w1 is a curve with a ratio of 1.0.

The curves of the MEMS speaker 100 is w2 and w3.

w2 is a curve with a ratio of 0.9. w1 is a curve with a ratio of 0.5.

What can be gained from FIG. 4 is:

The sound pressure level (SPL) of w2 and w3 is better than the sound pressure level (SPL) of w1, therefore, in the MEMS speaker 100 of the first embodiment of the present invention, the piezoelectric driver 3 is set at the sound pressure level of the third segment 23 which is higher than the sound pressure level (SPL) of the MEMS speaker in the related art.

As the ratio becomes smaller, the effect of raising the high frequency band is more obvious, but the sound pressure level valley appears in the low frequency band at the same time. Of course, since the use of this frequency band is not concerned, it can be ignored. But pay attention to the position of the sound pressure level valley, moving too much to the right will reduce the working frequency range of the MEMS speaker 100. Designers need to comprehensively consider the optimal design.

The polymer layer 4 is disposed on the side of the piezoelectric actuator 3 away from the cavity 10. The polymer layer 4 is attached to the cantilever beam 2 and the piezoelectric actuator 3. The polymer layer 4 completely covers the cantilever beam 2, the piezoelectric actuator 3 and the cavity 10. polymer layer 4, the cantilever beam 2 and the piezoelectric actuator 3 together form a piezoelectric composite vibration membrane structure for vibration and sound generation. The polymer layer 4 makes the cantilever beam 2 and the piezoelectric actuator 3 form a whole together. Since the polymer layer 4 completely covers the cavity 10, that is, the polymer layer 4 also covers the gap between the cantilever beam 2, the cantilever beam 2 and the substrate 1 opposite to its extension direction. Therefore, the sounding area of the piezoelectric composite vibration membrane structure is large, and the sounding area of the MEMS speaker 100 is large. Therefore, this structure increases the sounding area of the piezoelectric composite vibration membrane structure in the middle and high frequency bands, and has excellent response in the middle and high frequency bands. The vibration amplitude of the piezoelectric composite vibration membrane structure becomes larger, which increases the sound pressure level (SPL) of the MEMS speaker 100.

The polymer layer 4 is made of a high polymer material, and the material is favorable for bonding the cantilever beam 2 and the piezoelectric actuator 3 into a whole. And the part of the polymer layer 4 on the gap between the cantilever beam 2 and the substrate 1 opposite to the extension direction of the cantilever beam 2 can also serve as a flexible connection part. It is beneficial to the vibration of the piezoelectric composite vibration membrane structure, and also beneficial to increase the vibration sounding area of the piezoelectric composite vibration membrane structure, so that the sounding area of the MEMS speaker 100 is large.

In this first embodiment, the MEMS speaker 100 further include a dielectric layer 5. The dielectric layer 5 is sandwiched between the first section 21 and the substrate 1. The material of the dielectric layer 5 is different from that of the substrate 1. In this embodiment, the material of the dielectric layer is sio2 and the substrate is SI. Setting of the dielectric layer 5 is beneficial to the production process of the MEMS speaker 100, and is beneficial to the vibration of the cantilever beam 2.

Embodiment 2

Figure 5:
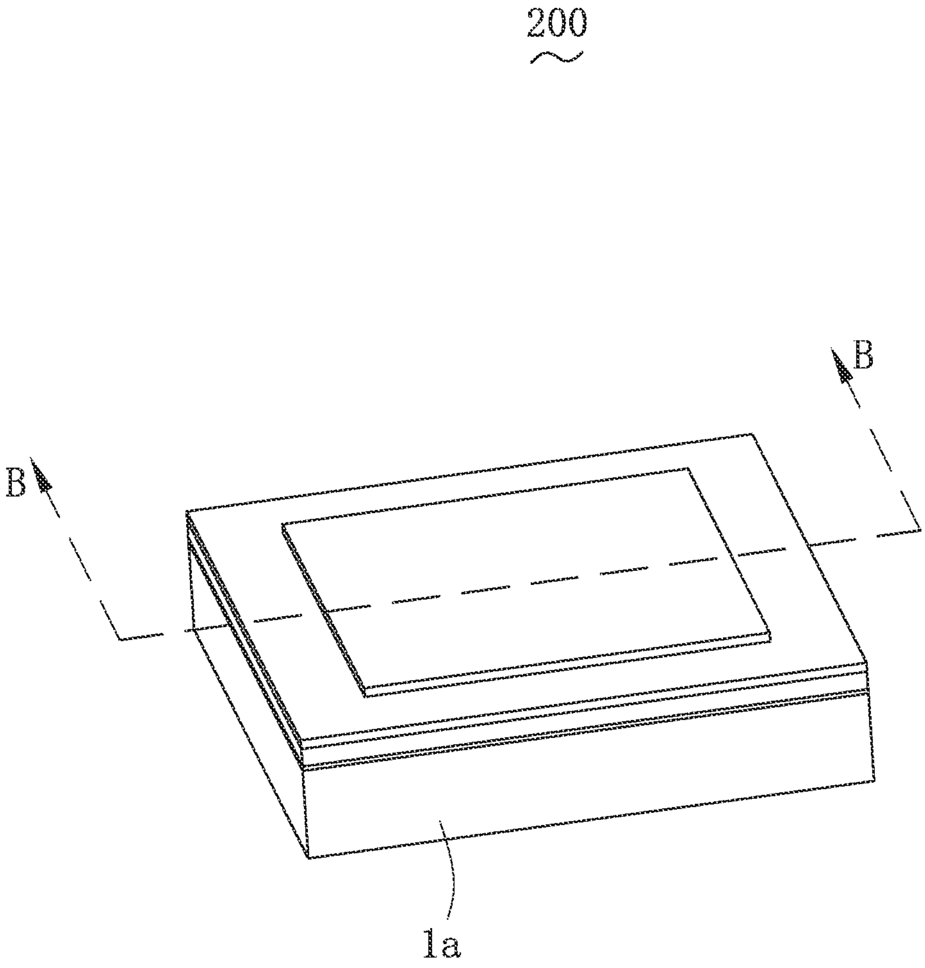
FIG. 5 is an isometric view of a MEMS speaker in accordance with a second embodiment of the present invention.
Figure 6:
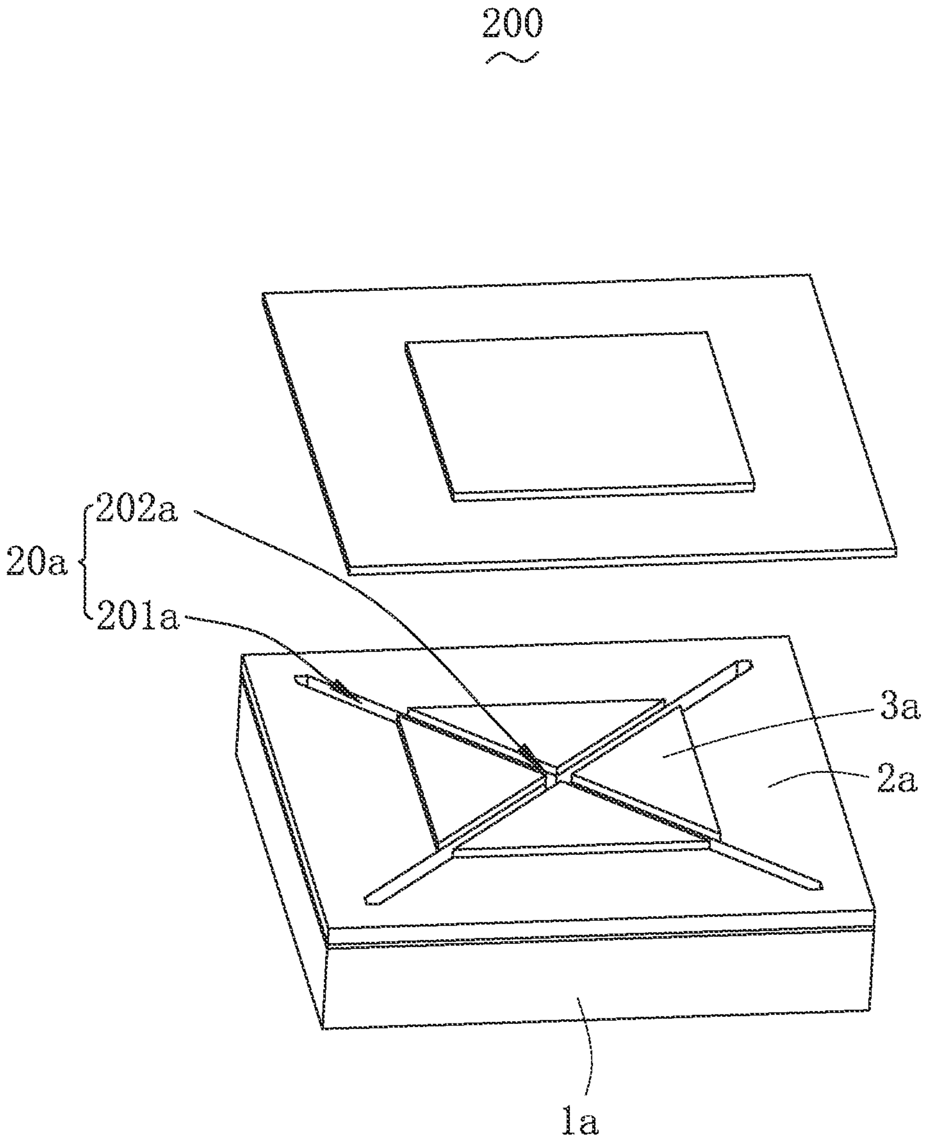
FIG. 6 is an exploded view of the MEMS speaker in FIG. 5.
Figure 7:
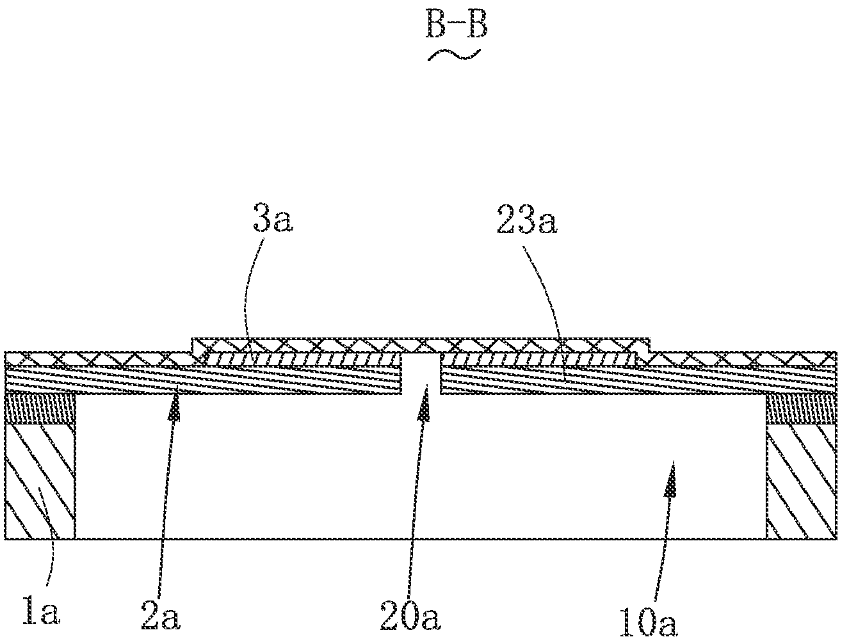
FIG. 7 is a cross-sectional view of the MEMS speaker taken along line BB in FIG. 5.

The present invention also provides a MEMS speaker 200. Please also refer to FIGS. 5-7, FIG. 5 is a schematic view of the MEMS speaker 200 of the second embodiment of the present invention.

The MEMS speaker 200 of the second embodiment and the MEMS speaker 100 of the first embodiment are the same, and the differences between the two are as follows:

The cantilever beams 2*a* include multiple pieces and are spaced apart from each other, and a first structural gap 201*a* is formed between two adjacent cantilever beams 2*a*. As an embodiment, the first structural gap 201*a* may be formed only between the third sections 23*a* of the two adjacent cantilever beams 2*a*. The piezoelectric actuator 3*a* includes a plurality of them. Each of the piezoelectric actuators 3*a* is fixed on one of the cantilever beams 2*a*. The ends of the third sections 23*a* of each of the plurality of cantilever beams 2*a* that are close to each other are arranged at intervals from each other and together enclose a second structural gap 202*a*. The first structural gap 201*a* is connected with the second structural gap 202*a* and together form a structural gap 20*a*. second structural gap 202*a* is located in the central region of the cavity 10*a*. The structural gap 20*a* is connected with the cavity 10*a*. A plurality of the cantilever beams 2*a* vibrate together in the corresponding plurality of the piezoelectric actuators 3*a* respectively, the vibration amplitude of the piezoelectric composite vibration membrane structure is larger than the vibration amplitude of the single cantilever beam 2*a*. This structure is advantageous in that the vibration amplitude of the MEMS speaker 200 is large, thereby increasing the sound pressure level (SPL) of the MEMS speaker 200.

In the second embodiment, the substrate 1*a* is rectangular, four of the cantilever beam 2*a* are included, each cantilever beam 2*a* is triangular, and the structural gap 20*a* is x-shaped. This structure facilitates the manufacture of MEMS speaker 200. The four symmetrical structures of the cantilever beam 2*a* and the piezoelectric actuator 3*a* are beneficial to the large vibration amplitude of the piezoelectric vibration composite membrane structure, and are also beneficial to improve the acoustic performance of the MEMS speaker 200, especially the sound pressure level (SPL).

Embodiment 3

Figure 8:
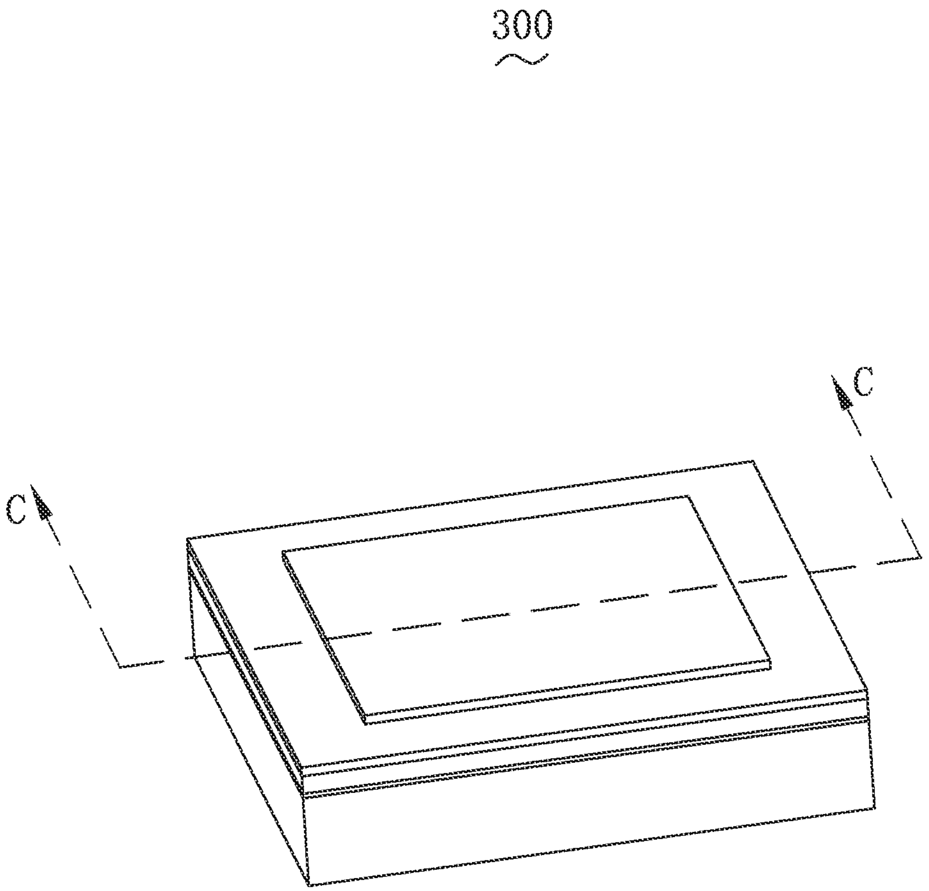
FIG. 8 is an isometric view of a MEMS speaker in accordance with a third embodiment of the present invention.
Figure 9:
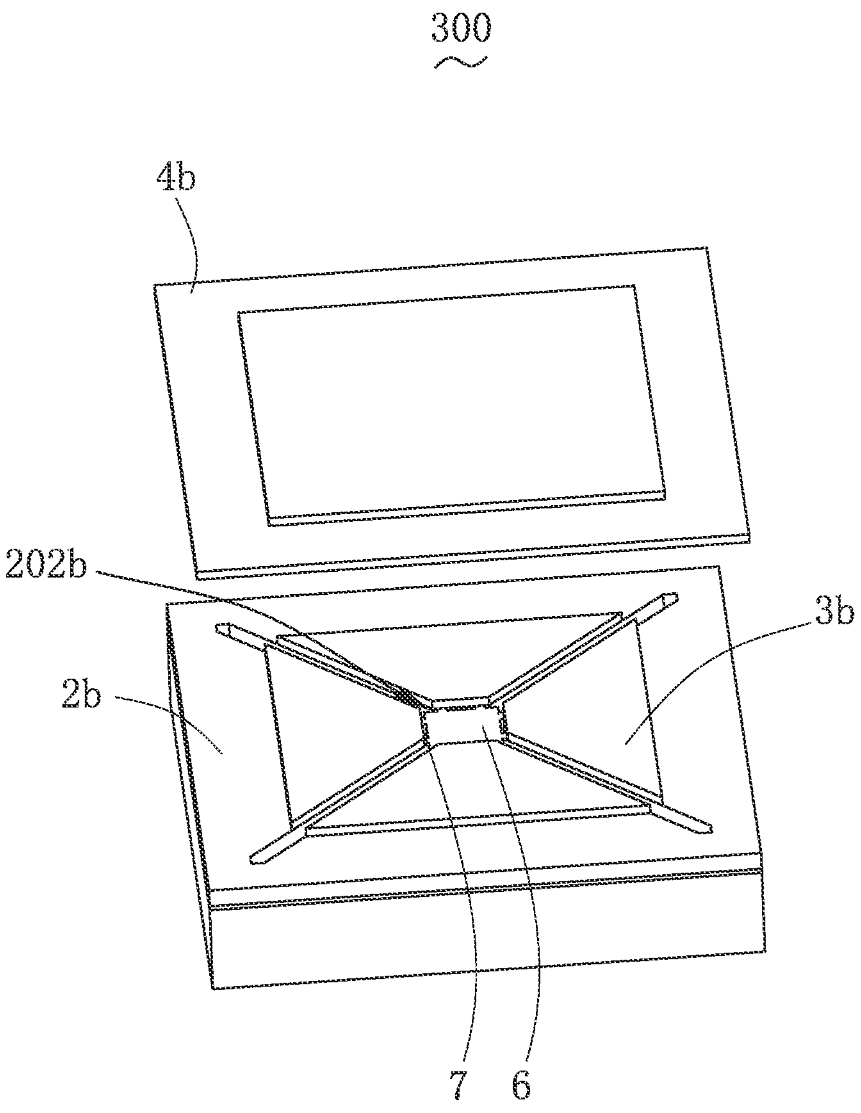
FIG. 9 is an exploded view of the MEMS speaker in FIG. 8.
Figure 10:
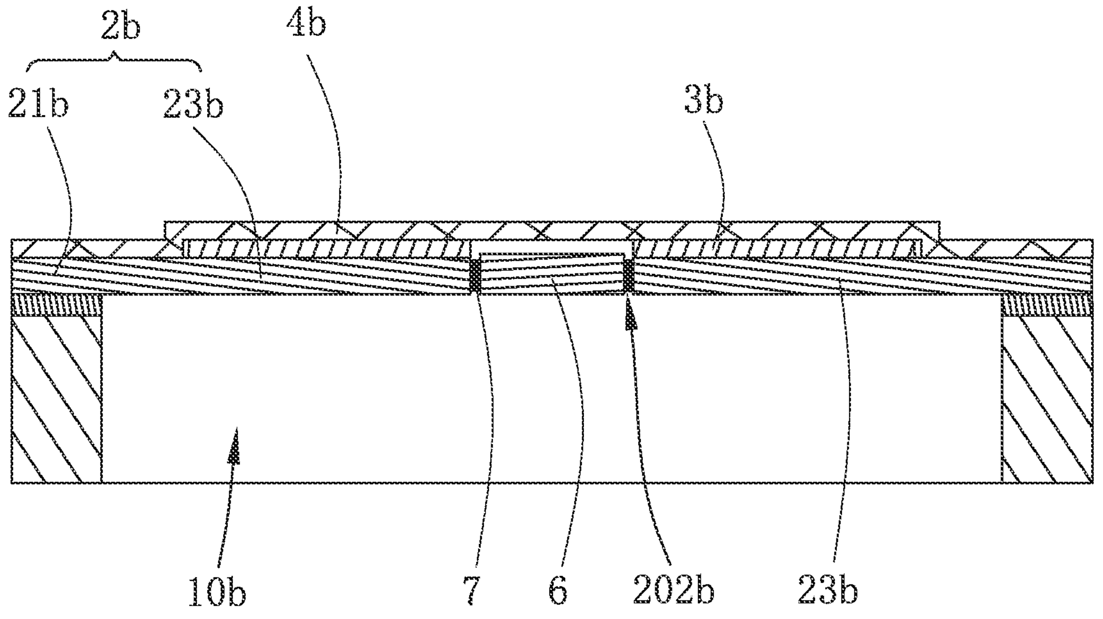
FIG. 10 is a cross-sectional view of the MEMS speaker taken along line CC in FIG. 8.

The present invention also provides a MEMS speaker 300. Please also refer to FIGS. 8-10, FIG. 8 is a schematic view of the MEMS speaker 300 of the third embodiment of the present invention.

The MEMS speaker 300 of the third embodiment and the MEMS speaker 200 of the second embodiment are the same, and the differences between the two are:

The mutually close ends of the four cantilever beams 2*b* together form the second structural gap 202 *b*.

The MEMS speaker 300 also include a weight 6. The weight 6 is accommodated in the second structural gap 202*b* and connected to the cantilever beam 2*b*. The weight 6, the polymer layer 4*b*, the cantilever beam 2*b* and the piezoelectric actuator 3*b* together form the piezoelectric composite vibration membrane structure. the weight 6 is beneficial to increase the vibration amplitude of the piezoelectric composite vibration membrane structure, and is also beneficial to increase the vibration sounding area of the piezoelectric composite vibration membrane structure. The sounding area of the MEMS speaker 300 is made large, so that the sound pressure level (SPL) of the MEMS speaker 100 is raised in the middle and high frequency bands.

The MEMS speaker 300 also include an elastic connection element 7. The elastic connection element 7 is accommodated in the second structural gap 202*b*. One end of the third section 23*b* of each of the cantilever beam 2*b* away from the first section 21*b* is connected to the weight 6 through the elastic connection element 7. In this third embodiment, four of the elastic connection elements 7 are included, and each elastic connection element 7 is connected to an adjacent third section 23*b*. The weights 6 are respectively connected to the four elastic connection elements 7. The elastic connection element 7 connects the weight 6 with the third section 23*b* as a whole, so that the weight for sound vibration is increased. Therefore, the vibration amplitude of the piezoelectric composite vibration membrane structure is increased, and the vibration sounding area of the piezoelectric composite vibration membrane structure is also increased. The sounding area of the MEMS speaker 300 is made large, so that the sound pressure level (SPL) of the MEMS speaker 100 is raised in the middle and high frequency bands.

In the third embodiment, the side of the weight 6 away from the cavity 10*b* is spaced from the polymer layer 4*b*. This structure makes the weight 6 and the third section 23*b* only pass through the elastic connection element 7, so that the piezoelectric composite vibration membrane structure has flexible vibration and large vibration amplitude, which improves the acoustic performance of the MEMS speaker 100.

Embodiment 4

Figure 11:
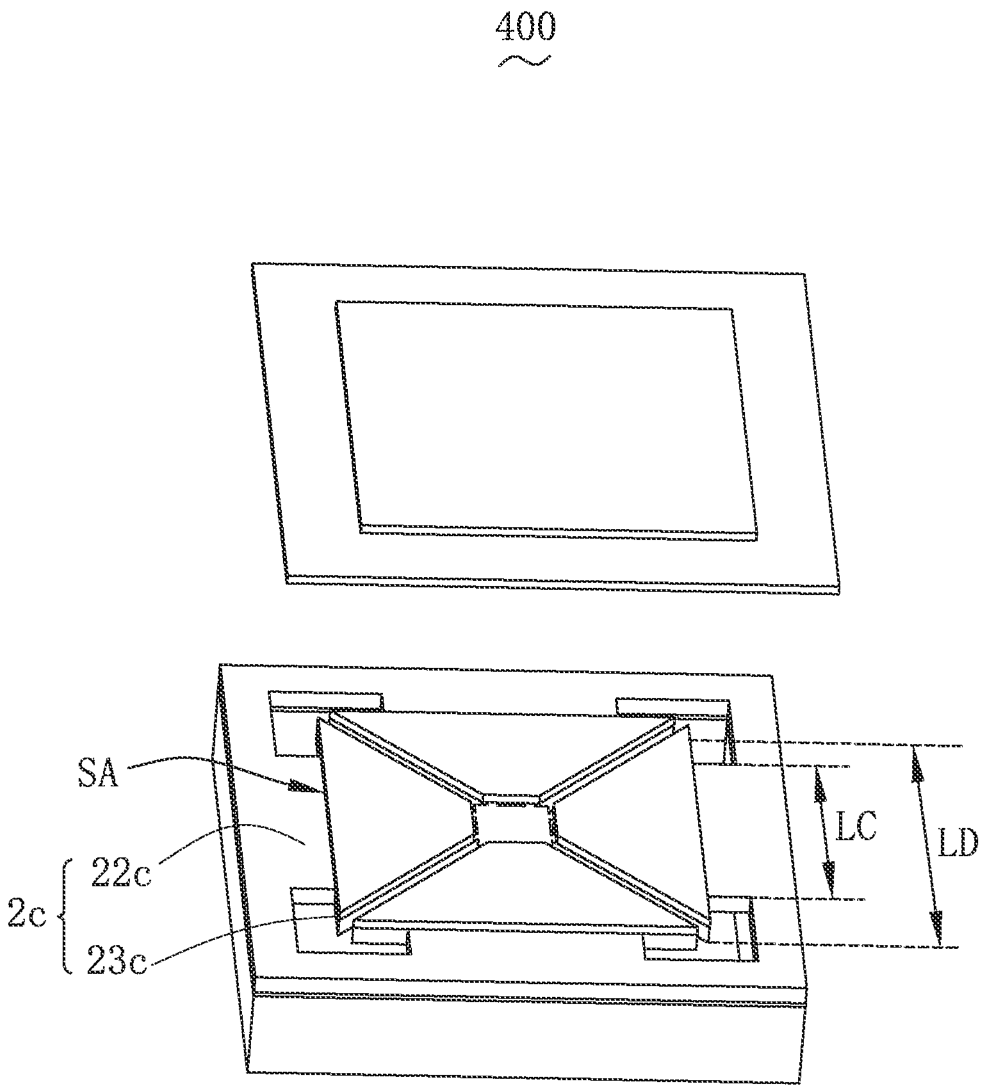
FIG. 11 is an exploded view of a MEMS speaker in accordance with a fourth embodiment of the present invention.

The present invention also provides a MEMS speaker 400. Please refer to FIG. 11 at the same time, FIG. 11 is a schematic view of the decomposition of a part of the three-dimensional structure of the MEMS speaker 400 of the fourth embodiment of the present invention.

The MEMS speaker 400 of the fourth embodiment and the MEMS speaker 300 of the third embodiment have the same structure, and the differences between the two are:

The sectional area of the second section 22*c* connected to connection position SA of the third section 23*c* is smaller than the sectional area of the third section 23*c* at this connection position SA In the extension direction of the cantilever beam 2*c*, the sectional areas at different positions of the second section 22*c* are equal, and the sectional areas of the third section 23*c* gradually decrease. As shown in FIG. 11, the length of the sectional area of the second section 22*c* at different positions is lc. Of course, the length of the sectional area of the second section 22*c* at the connection position sa is also lc. The length of the sectional area of the third section 23*c* at the connection sa is ld. Wherein, ld>lc.

That is to say, the structure for supporting the third section 23*c* is the second section 22*c*, and the second section 22*c* may be narrower than the width of the third section 23*c*. This structure reduces the overall stiffness of the vibration structure as the piezoelectric composite vibration membrane structure, thereby contributing to the improvement of the acoustic performance of the MEMS speaker 400.

Embodiment 5

Figure 12:
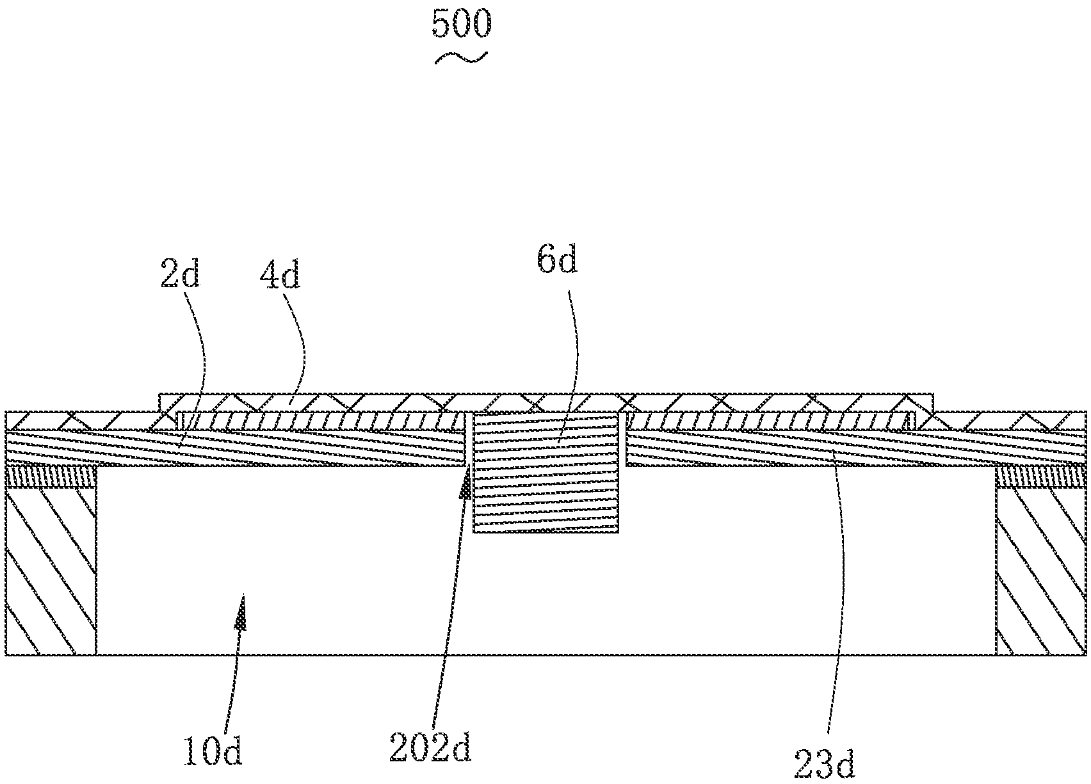
FIG. 12 is a cross-sectional view of the MEMS speaker in FIG. 11.

The present invention also provides a MEMS speaker 500. Please also refer to FIG. 12, which is a cutaway view of MEMS speaker 500 of the fifth embodiment of the present invention.

Basic structure of the MEMS speaker 500 of the fifth embodiment is the same as that of the MEMS speaker 300 of the third embodiment. The differences between the two are:

The side of the weight 6*d* away from the cavity 10*d* is fixed to the polymer layer 4*d*, and the weight 6*d* is spaced from the third section 23*d*. The weight 6*d* is accommodated in the second structural gap 202*d* and connected to the polymer layer 4*d* or the cantilever beam 2*d*. In this fifth embodiment, the weight 6*d* is accommodated in the second structural gap 202*d* and connected to the polymer layer 4*d*. Specifically, the side of the weight 6*d* away from the cavity 10*d* is fixed to the polymer layer 4*d*. The weight 6*d* is fixed by the polymer layer 4*d*, which is beneficial to the vibration of the piezoelectric composite vibration membrane structure as a whole, so that the acoustic performance of the MEMS speaker 500 is good. Compared with the MEMS speaker 300, in the MEMS speaker 500 of the fifth embodiment, the elastic connection element 7 is removed, so that the MEMS speaker 500 have a simple structure and are easy to be manufactured.

The weight 6*d* is adjustable in height and extends at least partially into the cavity 10*d*. The weight 6*d* is adjustable in height, which is helpful for the designer to adjust the dynamic characteristics of the vibration structure as the piezoelectric composite vibration membrane structure, thereby improving the acoustic performance of the MEMS speaker 500.

Compared with related technologies, in the MEMS speaker provided by the present invention, the cantilever beam is set as the first section, the second section and the third section extending in sequence, and the piezoelectric actuator is only fixed in the third section. The second section is spaced apart from and between the third section and the first section fixed on the substrate, and the second section is suspended above the cavity. The end of the third section away from the second section is suspended. When powered on, the piezoelectric actuator drives the third section to vibrate to drive the second section to vibrate. The polymer layer, the cantilever beam and the piezoelectric actuator together form a piezoelectric composite vibration structure for vibrating sound, thus, the sounding area of the MEMS speaker is large. Excellent mid-to-high frequency response improves the sound pressure level (SPL) of the MEMS speaker.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A micro-electromechanical system (MEMS) MEMS speaker including:

a substrate enclosing a cavity and being provided with openings at both ends;

a cantilever beam extending from one end of the substrate to the cavity and at least partially suspended above the cavity;

a piezoelectric actuator fixed on a side of the cantilever beam away from the cavity;

a polymer layer disposed on a side of the piezoelectric actuator away from the cavity and attached to the cantilever beam and the piezoelectric actuator for completely covering the cantilever beam, the piezoelectric actuator and the cavity;

a piezoelectric composite vibration structure formed by the polymer layer, the cantilever beam and the piezoelectric actuator for generating vibration and sound;

wherein the cantilever beam includes a first section fixed to the substrate, a second section extending from the first section to the cavity and suspended above the cavity, and a third section extending from the second section away from the first section, an end of the third section away from the second section being suspended; and the piezoelectric actuator is only fixed with the third section;

the MEMS speaker further includes a weight connected to the polymer layer or the cantilever beam; the weight is adjustable in height and extends at least partially into the cavity.

2. The MEMS speakers as described in claim 1, further including a dielectric layer sandwiched between the first section and the substrate; wherein a material of the dielectric layer is different from that of the substrate.

3. The MEMS speakers as described in claim 2, wherein the piezoelectric actuator includes a first electrode, a piezoelectric layer and a second electrode stacked in a sequence on the third section along a thickness direction of the MEMS speakers; a projection of the piezoelectric actuator along the thickness direction of the MEMS speakers covers only the third section.

4. The MEMS speakers as described in claim 3, wherein, a sectional area of the second section connected to the connection position of the third section is smaller than a sectional area of the third section at a connection position; in the extension direction of the cantilever beam, the sectional areas at different positions of the second section are equal, and the sectional areas of the third section gradually decrease.

5. The MEMS speakers as described in claim 3 including multiple spaced cantilever beams and multiple piezoelectric actuators; wherein a first structural gap is formed between two adjacent cantilever beams; each of the piezoelectric actuators is fixed on one of the cantilever beams; ends of the third sections of each of the plurality of cantilever beams that are close to each other are spaced apart from each other and together form a second structural gap communicated with the first structural gap and forms a structural gap together; the second structural gap is located in a central region of the cavity; and the structural gap is communicated with the cavity.

6. The MEMS speakers as described in claim 5, wherein, the first structural gap is formed between the third sections of two adjacent cantilever beams.

7. The MEMS speaker as described in claim 5, wherein the weight accommodated in the second structural gap; the weight, the polymer layer, the cantilever beam and the piezoelectric actuator together form the piezoelectric composite vibration structure.

8. The MEMS speaker as described in claim 7, further including an elastic connection element accommodated in the second structural gap; wherein one end of the third section of each cantilever beam away from the first section is connected to the weight through the elastic connection element.

9. The MEMS speakers as described in claim 7, wherein a side of the weight away from the cavity is fixed to the polymer layer; and the weight is spaced from the third section.

* * * * *